United States Patent [19]

Gemmell et al.

[11] 4,031,826

[45] June 28, 1977

[54] DETONATION SYSTEM AND METHOD

[75] Inventors: Frank S. Gemmell; Mark A. Fried, both of Scottsdale, Ariz.

[73] Assignee: Motorola, Inc., Schaumburg, Ill.

[22] Filed: Dec. 22, 1975

[21] Appl. No.: 642,879

Related U.S. Application Data

[62] Division of Ser. No. 512,651, Oct. 7, 1974, Pat. No. 3,971,317.

[52] U.S. Cl. .................................. 102/20; 166/63; 340/18 NC
[51] Int. Cl.² ......................................... E21B 43/26
[58] Field of Search ............... 102/20, 21; 166/63, 166/299; 340/18 NC

[56] References Cited

UNITED STATES PATENTS

| | | | |
|---|---|---|---|
| 3,205,477 | 9/1965 | Kalbfell | 340/18 NC |
| 3,233,674 | 2/1966 | Leutwyler | 340/18 NC |
| 3,718,088 | 2/1973 | Bearden et al. | 102/21 |
| 3,790,930 | 2/1974 | Lamel et al. | 340/18 NC |

*Primary Examiner*—Verlin R. Pendegrass
*Attorney, Agent, or Firm*—M. David Shapiro

[57] ABSTRACT

A remotely situated detonator is acoustically triggered to detonate explosives. Conduit means capable of propagating an acoustic wave is used to transmit a precoded acoustic wave signal from a transmitter to a receiver. The receiver is provided with means for converting the precoded acoustic wave signal to an electrical output signal to actuate the detonator and decoding means for discriminating against noise signals. For safety reasons, time delay means may be provided to delay generation of the acoustic wave signals until after a predetermined time period. The aforedescribed detonation system may be utilized to rejuvenate or activate subterranean petroleum, gas, geothermal steam, or water and the like.

9 Claims, 6 Drawing Figures

DETONATION SYSTEM AND METHOD

This is a division, of application Ser. No. 512,651, filed Oct. 7, 1974, and now U.S. Pat. No. 3,971,317.

BACKGROUND OF THE INVENTION

Subterranean explosives have been used for many years for geological mapping and exploratory efforts and for activating or rejuvenating relatively dormant subterranean deposits of petroleum, gas, water or stream. Typically, a gaseous, solid, or liquid charge medium was pumped down a well casing and permeated and earth structure in the vicinity of the end of the casing which may have been several thousands of feet below the surface. A detonating device was then located in the gaseous or liquid explosive medium or environment and initiated by remote wire or timer control. To protect the well casing from damage from the ensuing explosion, a plug was placed in the casing above the charge to limit the charge from propagating upward from the lower end of the well casing. Above the plug, concrete, liquid or other suitable tamping material was used. The charge was exploded from the surface electrically via wires connecting the detonator below to the surface.

But the use of wires to initiate detonation created problems of reliability because the wiper plug and tamping obstruction was in the way for the wires. Also, the substantial depths necessary for proper placement of the detonators to which the wires had to be connected caused difficulties in placing the wires. This had led to the use of timers in the detonators to avoid the necessity for providing the electrical wires. However, timers did not eliminate safety problems against accidental detonation and it introduces reliability problems due to failures in the timer mechanisms. This system also lacked flexibility in that the timer had to be set long enough to allow for time delays in placement of the detonator and tamping plug while, if there were no undue delays, the operators had to wait the full term of the timer before detonation, even though all preparations for the explosion may have been completed for some time.

SUMMARY OF THE INVENTION

Accordingly, it is an object of the invention to provide an improved system for initiation of a detonator.

It is another object of the invention to provide an improved safety in the actuation of a detonator.

It is a further object of the invention to provide a more reliable detonator system.

It is a still further object of the invention to provide a detonator system that is faster to install and easier to use.

It is yet another object of the invention to provide an improved detonation method.

it is still another object of the invention to provide a safer detonation method.

It is another object of the invention to provide a detonation method that is easier to implement.

It is a further object of the invention to provide an improved detonation method for rejuvenating or activating a subterranean material sorce, such as underground petroleum, gas, geothermal energy, water supply and the like.

In accordance with the present invention, the foregoing and other objects are attained by transmitting a precoded acoustic signal through an acoustic wave conduit means and converting the acoustic signal to an electrical output signal to actuate the detonator.

According to another feature of the invention, the safety and reliability of the detonator system is increased by using an adjustable time delay means that can be set to provide a predetermined time delay in actuating the detonator and decoding means to prevent false triggering of the detonator by noise signals.

In accordance with a further feature of the invention, the aforementioned triggering method is advantageously utilized to activate or rejuvenate a subterranean resource, such as petroleum, gas, water or geothermal steam by actuating a detonator to initiate explosives disposed at the lower end of the bore hole in the vicinity of the resource, as follows:

First, using a pipe string, an acoustic receiver is lowered into a well casing after the receiver is acoustically couled to the lower end of a pipe string. Then, the explosive material is pumped down through the pipe string in the bore hole toward the bottom near the source in a conventional manner. An acoustic transmitter is housed in a wiper plug and is then conveyed down the pipe string by well head pumping pressure to a predetermined pipe joint wherein a switch actuating member is positioned. The actuating member actuates the acoustic transmitter by activating switches contained therein. The transmitter then begins transmission, either immediately, or after a preset delay time, according to the selection made in the transmitter before disposition in the pipe string. Preferably, the transmitter and receiver utilize digital pulse coding techniques to avoid detonation due to extraneous acoustic signals.

The foregoing and other objects, features and advantages of the invention will be apparent from the following detailed description of the preferred embodiments of the invention in conjunction with the accompanying drawings.

Detailed Description of the Illustrative Embodiment of the Invention

Figure 1:
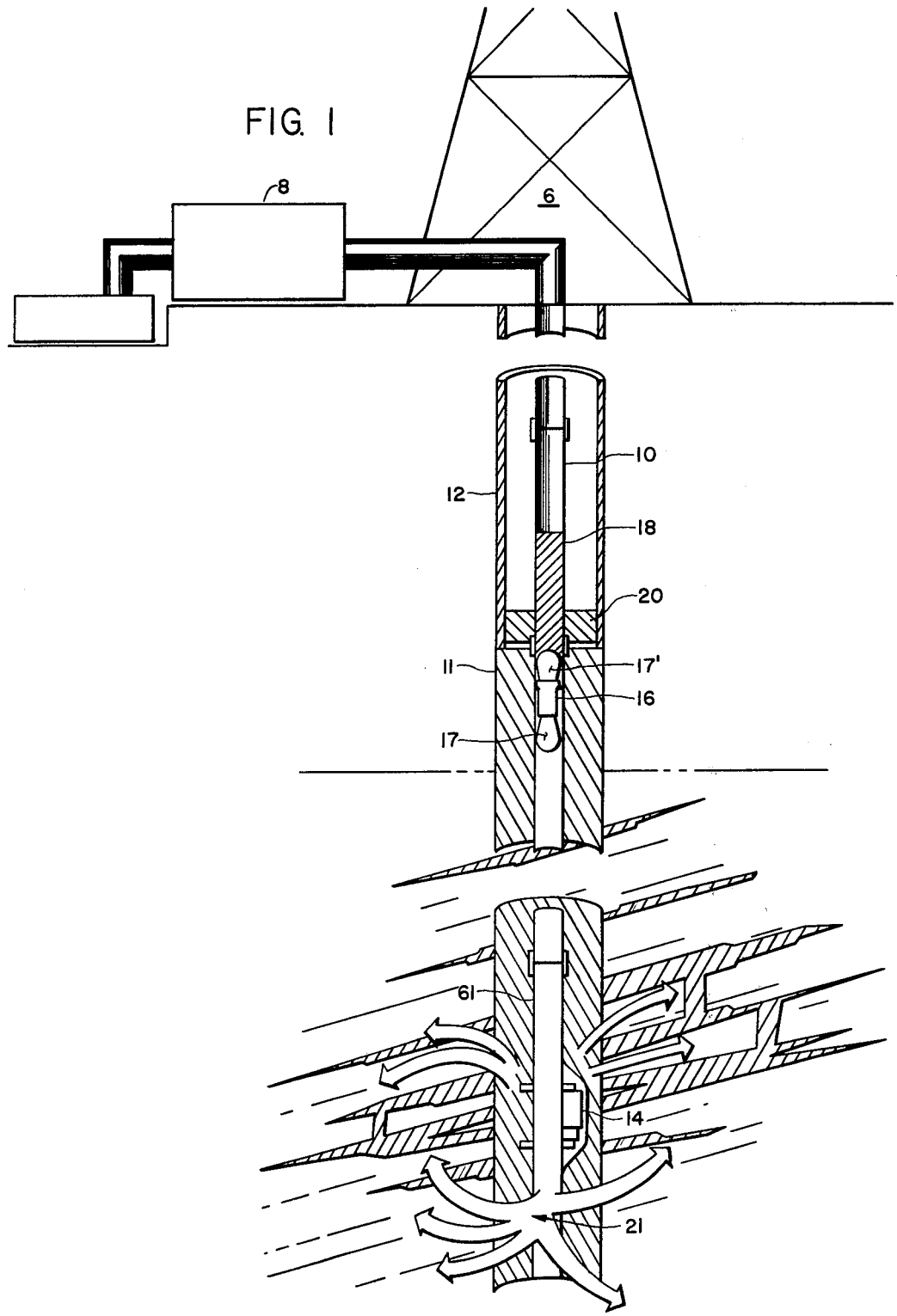
FIG. 1 is a digrammatic view of an oil well having a bore hole with the transmitter and receiver of the invention in position for use.

FIG. 1 shows a well where explosives may be used to loosen a subterranean area where there may be relatively dormant petroleum, gas and other such underground fluid matter that are entrapped by the surrounding mass of rocks, earth and the like.

To effect the controlled explosion, first an acoustic receiver detonator 14, is attached to the lower end of the last section 61 of pipe string 10. Then the pipe string 10 is lowered in position so that the receiver/detonator is placed at a subterranean location in the desired detonation region. Then, acoustic transmitter 16 is lowered into pipe string 10 and disposed some predetermined distance above the receiver/detonator 14. Transmitter 16 is contained in a conventional wiper plug, assembly 17 which has been modified to contain it. This wiper plug is used in a manner well known in the art to separate explosive from tamping material 18. An expandable packer 20 is placed on the pipe string 10 and is used as a seal between the outside of the pipe string 10 and the well casing 12, as is well known in the art. The combination of the tamping material 18 located above wiper plug 17 and expandable packer 20 serves to separate explosive material 21 from the upper portion of the pipe string 10 and well casing 12.

Figure 2:
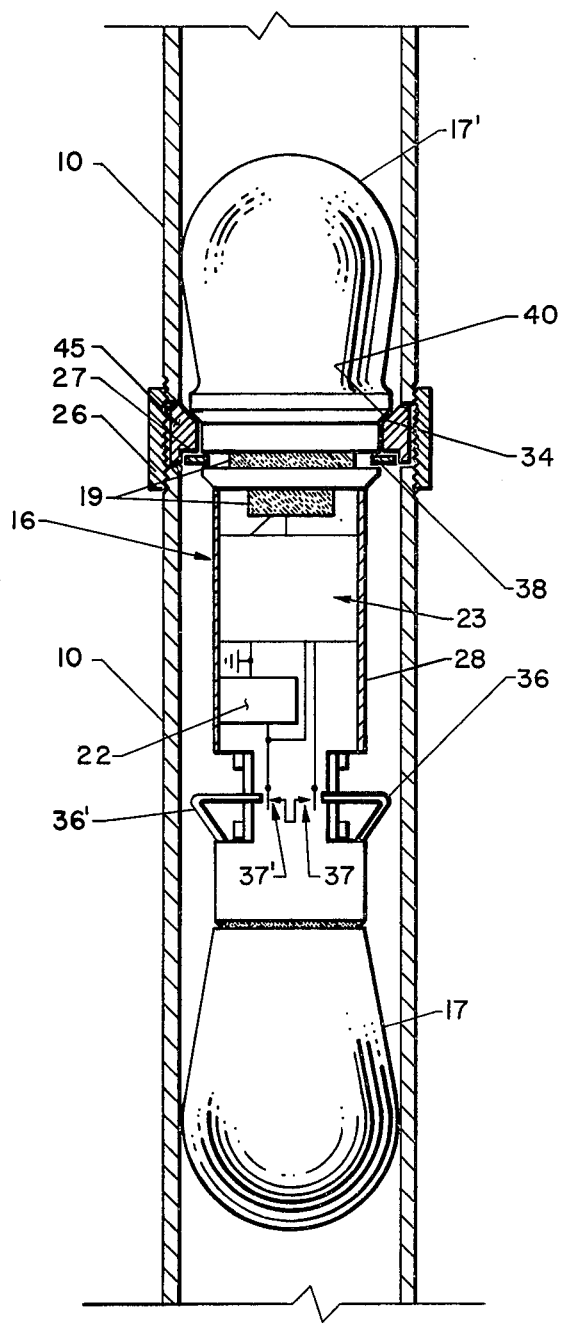
FIG. 2 is an enlarged partially sectional view of the transmitter of FIG. 1 showing the details of the latching, switch mechanisms and transducer means and showing disposition of the transmitter in a pipe string located in a bore hole.

FIG. 2 shows an illustrative example of transmitter 16 disposed in place within pipe string 10. The transmitter includes a switch actuator member 45 preferably disposed between two adjacent pipe string 10 members. The actuator may be in the form of a bevelled ring and positioned between the two opposing ends of the pipe sections 10, 10'. A threaded coupler 26 is provided to couple two adjacent ends of the two sections of the pipe string to contain the actuator member 45. The switch actuator 45 is positioned in pipe string 10 at the desired location before the pipe string 10 is lowered into well casing 12 (FIG. 1). Switch actuator 45 includes a protruding bevelled section 34. As the transmitter 16 traverses past the bevelled section 34, retractable switch arms 36, 36' provided in the transmitter are urged inwardly by the bevelled surface and causes the arms to touch contacts 37, 37'. In response to the closing of both contacts, a suitable means (not shown) for starting the transmitter is actuated. The starting means may be a conventional one shot start circuit that provides a DC power from a battery 22 conveniently provided for the purpose.

A suitable snap ring member 38 is disposed on the transmitter and disposed as shown. As the transmitter traverses past the bevelled section 34 the snap ring compresses inwardly and allows its passage through the bevelled switch actuator 45. After the snap ring clears the actuator 45, it reverts back outwardly to its original configuration in recessed portion 27 and snaps into the recess, thereby locking the transmitter in place around the actuator 45.

There is provided a mating bevelled surface 40 on transmitter 16 to engage with bevel 34 of switch actuator 45 to prevent movement downward of transmitter 16. Snap ring 38 engages the lower side of switch actuator 45 to prevent upward movement of transmitter 16. The lower side of switch actuator 45 and the upper side of snap ring 38 are preferably bevelled in cooperation with one another to mate and thereby assure a desirable tight fit to provide a good mechanical and acoustic contact and to retain transmitter 16 rapidly within pipe string 10. Transmitter 16 has an acoustic coupler 19 coupled internally to bevelled portion 40 of the transmitter housing. This provides acoustic coupling from transmitter 16 to pipe string 10. Transmitter 16 is preferably built into a conventional wiper plug assembly which includes a hollow cylindrical member 28 positioned between a pair of resilient ball shaped plugs 17 and 17' of a conventional design. The electrical parts of the transmitter such as battery 22, switches 37 and 37' and electronic circuit 23 are housed in the cylindrical member 28.

Figure 3:
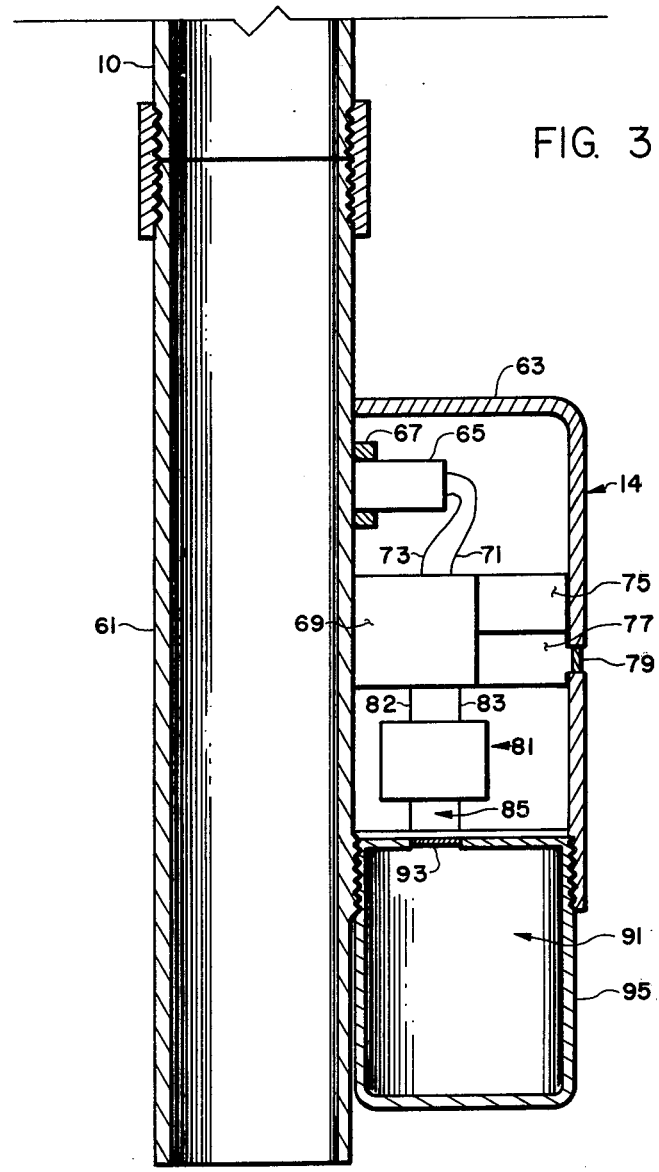
FIG. 3 is an enlarged partially sectioned view of the receiver of the invention as installed in the bore hole of FIG. 1.

FIG. 3 shows a partially sectioned view of the receiver/detonator 14 assembly of the present detonation system. The receiver/detonator 14 is mechanically coupled to the end section of the pipe string 10 by a section of pipe member 61. Preferably the inner diameter of pipe section 61 is dimensioned to match that of the pipe string. As illustrated, the end of the pipe string is threaded and so is the pipe section. This permits easy coupling and decoupling of the receiver/detonator assembly to the pipe section by threading action.

The receiver/detonator 14 is generally housed in a suitable container means 63. The receiver/detonator includes an acoustic transducer 65 which is rigidly and mechanically coupled to the pipe section 61 by a suitable fastening member 67. The transducer maybe made of a piezoelectric element and is coupled to the electronic part 69 of the receiver via conductors 71 and 73. The receiver includes a battery 75 for powering the electronic circuitry 69. There is provided a starting or trigger switch 77 operatively coupled to the outside of the housing 63 via a pressure sensitive element 79 which is preset or made to yield at a predetermined external pressure level. For example, pressure sensitive member 79 may be set at a given high pressure that will be encountered underground. Thus when the whole receiver/detonator assembly 14 is lowered into the bore hole as it reaches a certain depth and encounters the critical pressure at which the pressure element 79 is set, the start switch 77 is actuated. This in turn activates the electronic circuit part 69 and enables it to receive incoming acoutical signals being propagated down the pipe string 10, the pipe section 61, the transducer 65 and hence to the electronic circuitry 69. The pressure sensitive mechanism provides means whereby the receiver/detonator, containing the booster charge is not armed during handling. The system remains safe until it is placed below the surface to a level where environmental pressure exceeds threshold.

The receiver/detonator 14 includes a detonator 81 electrically coupled to the electronic circuitry 69 via conductor wires 82 and 83. A lead charge member 85 is coupled to the detonator 81 where it is desirable to provide stronger trigger action to start the explosive than that provided by the detonator. A booster charge 91 having a substantial amount of charge may be coupled to the lead charge member 85 through sealing wall 93. For obvious safety reasons, preferrably the booster stage 91 is made portable separately from the rest of the receiver/detonator 14 assembly. the booster may come in a canister 95 which is threaded at ore end so that it can be threaded into the thread provided in the housing for the receiver/detonator, as illustrated. Such a design permits separate transportion and storage of the rather powerful booster charge 91 separately from the rest of the receiver/detonator. In operation, the receiver/detonator 14 is energized to be ready to receive the acoustic signal from the transmitter by the pressure actuated switch 77. The receiver/detonator then responds to the acoustic signal as its piezoelectric transducer 65 responds to the acoustic signal, converts it to an electrical signal, and applies it to the electric circuitry 69. the circuitry 69 in turn generates a trigger signal to trigger the detonator 81. The explosive charge given out by the detonator 81 may not be enough to trigger the explosive material pumped into the underground area in its vicinity. The lead charge 85 responds to the explosion of the detonator and provides a triggering force to the booster charge 91. In turn the booster 91 explodes and causes the explosive surrounding it to explode.

Figure 4:
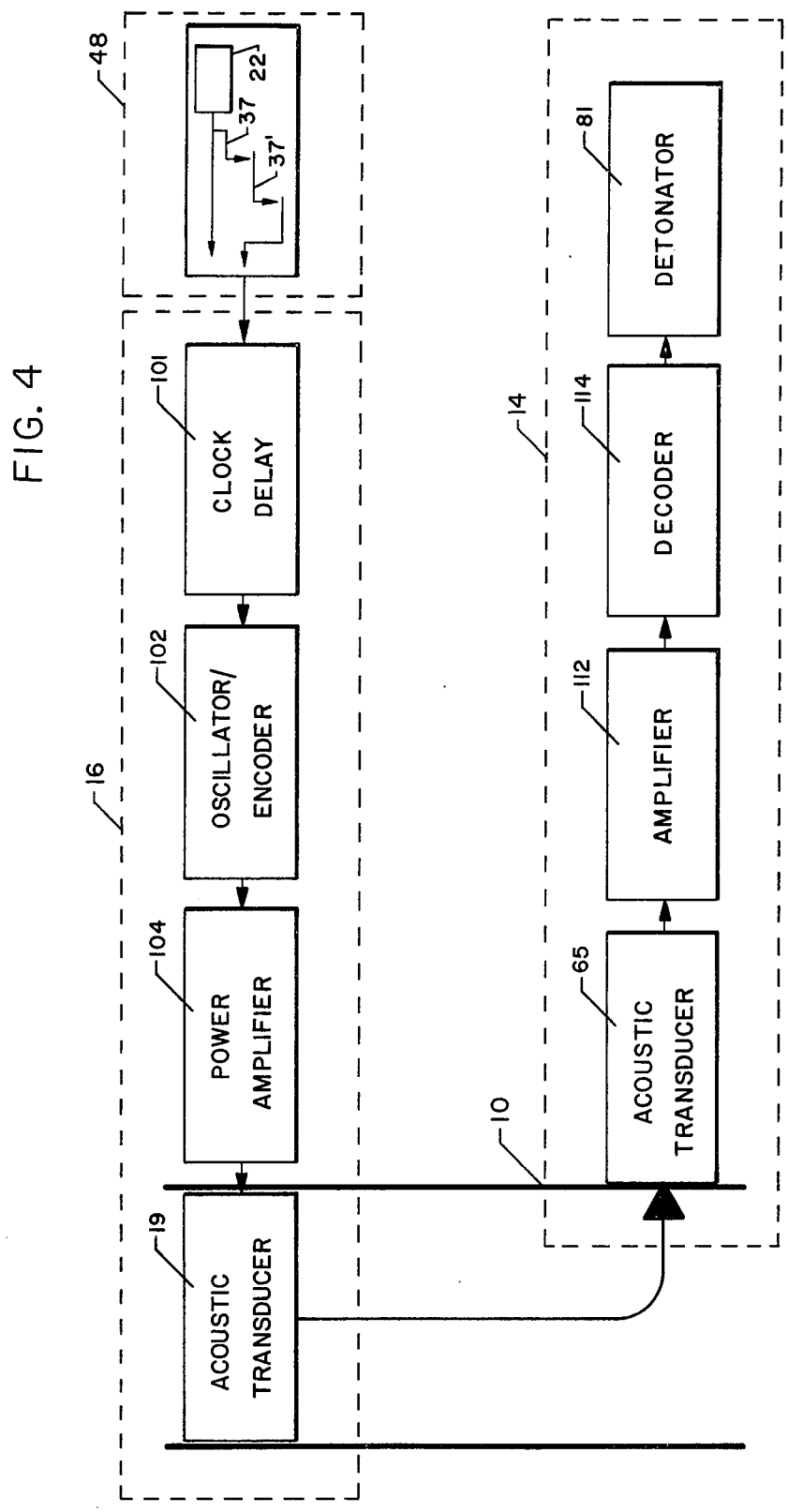
FIG. 4 is a functional block diagram of the electrical aspect of the detonating system.

Now referring to the electrical circuitry involved in the present invention, FIG. 4, in a block diagram, shows a transmitter circuitry 16. The transmitter circuitry includes starter 48, clock delay 101, oscillator/encoder 102 and power amplifier 104 connected in a series cascade for generating an encoded signal to the acoustic coupler 19.

Clock delay 101 is preferably turned on by simultaneous closing of switch controls 37, 37'. Clock delay circuit 101 may be of any suitable conventional design of a variable timer with means to set its delay time to any suitable time period from zero on upward to half an hour, an hour or longer duration. Clock delay 101 controls the application of power to the rest of transmitter 16 electronics. At the conclusion of preset time delay, oscillator/encoder 102 and power amplifier 104 are powered and transmitter 16 transmits an acoustic signal by way of acoustic transducer 19.

Preferably, the oscillator/encoder 102 is of a design that modulates or encodes the clock output into a signal format that assures best overall noise immunity of the detonation system to prevent false triggering of the detonator.

Figure 5:
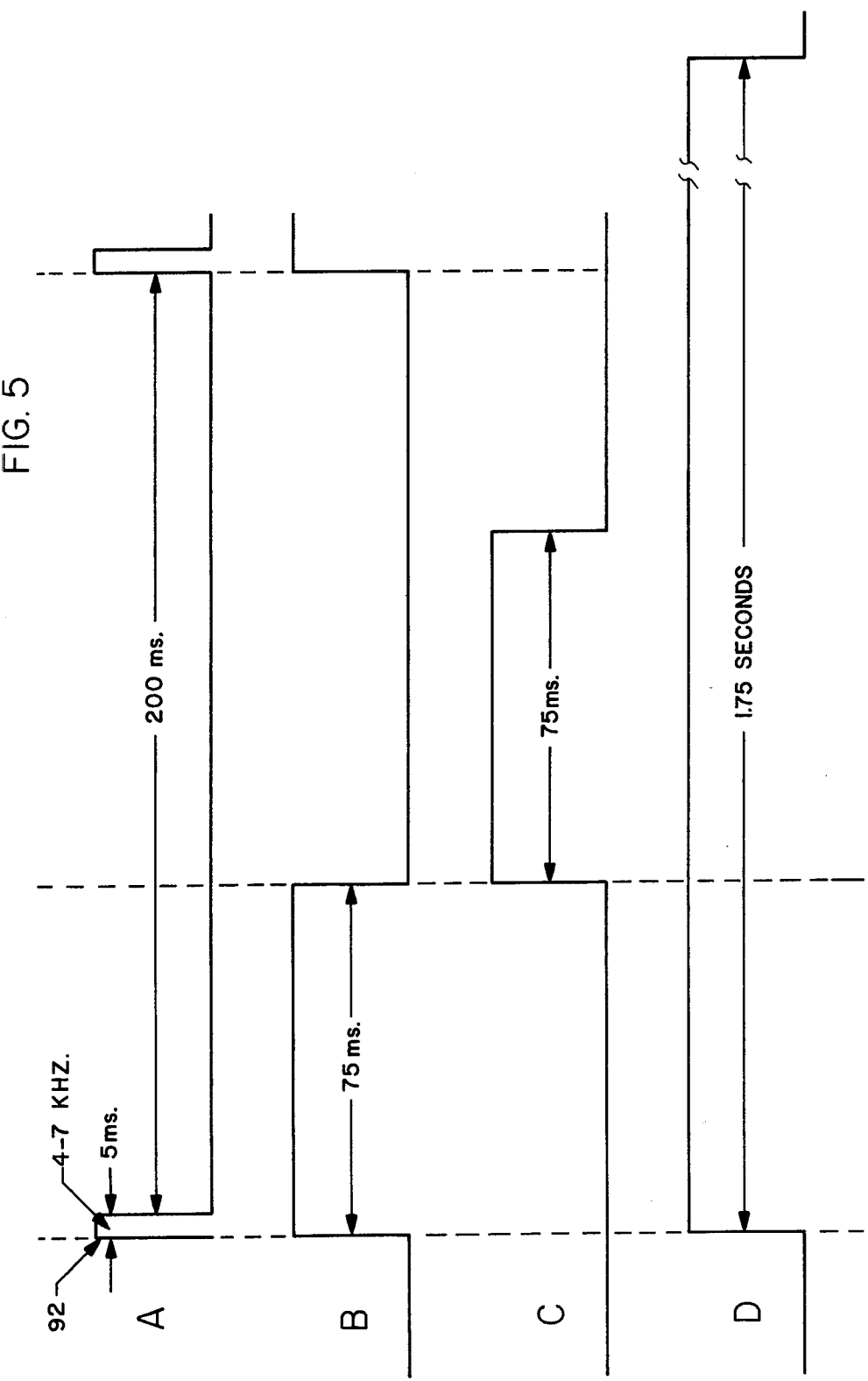
FIG. 5 is a timing diagram of the transmitter and receiver units of FIG. 4.

The encoder signal so generated may be periodic or aperiodic. If the external noise source, such as the pump motor, creates periodic acoustic waves down the pipe string, it is preferred that the transmitter generate aperiodic signals that are different from periodic noise signals introduced into the system by the external pump motor. So the encoding or modulation operation entails a generation of a periodic train of pulses in successive frames of a predetermined repetition rate. Periodic pulses generated in this manner are illustrated in FIG. 5A 92. For example, the carrier frequency may be one selected in the range from 4 KHz and generated for a given duration, such as five milliseconds.

The pulses may be repeated at a regular interval of approximately 200 milliseconds. Of course, it will be apparent to one skilled in the art that these frequencies, duration, and repetition rates or formats are by way of example only.

As illustrated in FIG. 4, the encoded signal is then applied to the transducer which in turn converts the coded electrical signal into corresponding acoustic wave signals. The resulting acoustic wave is transmitted through the pipe string 10 acting as an acoustic wave conductor.

The coded acoustic wave propagating down the pipe string reaches the transducer 65 and thence is applied to the receiver 14. As generally illustrated in a block diagram the receiver includes amplifier 112 and decoder 114 connected in series. The output of the decoder is applied to the detonator 81 and thence to trigger lead charge 85 (FIG. 3). As lead charge 85 explodes it causes booster 91 to ignite. Once the booster is ignited, the explosives pumped into underground are then exploded.

Transducer 65 is preferably coupled to amplifier 112 within receiver 14. The amplifier is provided to supply sufficient signal power for decoder 114 and is designed to provide impedance matching for transducer 65.

Figure 6:
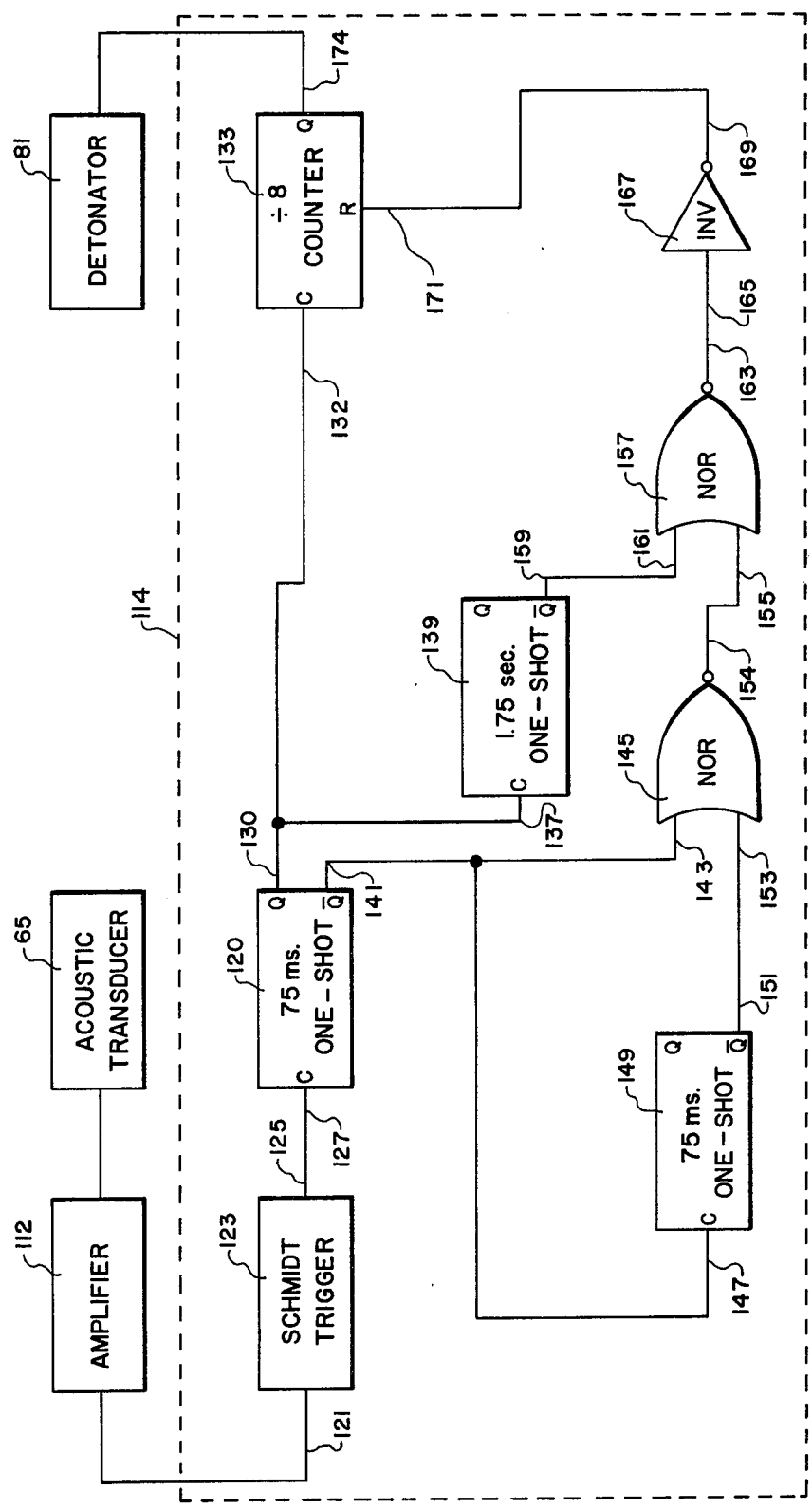
FIG. 6 is a logic diagram of the electrical aspect of the receiver shown in FIG. 4.

FIG. 6 illustrates an examplary circuit for use in decoding the aforementioned encoded signal coming in the form of a pulse train of a predetermined repetition rate and duration. Now referring more specifically to the detailed circuitry of the decoder in FIG. 6, the output of the amplifier 112 is connected to input terminal 121 of Schmidt Trigger 123. Output terminal 125 of Schmidt Trigger 123 is connected to input terminal 127 of 75 millisecond one-shot multivibrator 120. Output terminal 130 of one-shot multivibrator 120 is connected to C input terminal 132 of 8 bit shift register 133 and to C input terminal 137 of 1.75 second one-shot multivibrator 139. $\overline{Q}$ output terminal 141 of one-shot multivibrator 120 is connected to input terminal 143 of NOR gate 145 and to C input terminal 147 of 75 millisecond one-shot multivibrator 149. $\overline{Q}$ output terminal 151 of one-shot multivibrator 149 is connected to input terminal 153 of NOR gate 145. Output terminal 154 of NOR gate 145 is connected to input terminal 155 or NOR gate 157. $\overline{Q}$ output terminal 159 of one-shot multivibrator 139 is connected to input terminal 161 of NOR gate 157. Output terminal 163 of NOR gate 157 is connected to input terminal 165 of inverter 167. Output terminal 169 of inverter 167 is connected to reset R terminal 171 of 8 bit shift register 133. Output terminal 174 of eight bit shift register 133 is connected to detonator 81.

The operation of the system may now be described with reference to the drawings in general and, in particular, with reference to FIG. 1.

Short pipe section 61 carrying receiver 14 is coupled to a first lower section of pipe string 10. The receiver 14 is provided with the battery 75 in a conventional manner in a place provided therefor when the detonator system is being set up. Preferably, the battery should be of the type that has a definite given life time such as 5 days to assure the operation of the receiver for that duration. The pipe string is then lowered into well 11. Successive pipe string 10 sections are joined in series by coupler 26 and lowered until a predetermined joint in the pipe string 10 is placed near the end of well 11 which may be several hundred feet above receiver 14. Additional sections of pipe string 10 are coupled in tandem until receiver 14 is conveyed to a desired depth near the bottom of well 11. Pressure sensing means 79 activates switch 77 as it reaches the point where the ambient pressure reaches a certain level. In turn, the switch energizes the electronic circuitry 69 so that it is conditioned to receive incoming signals.

Pump 8 at well head 6 is used to force an explosive mixture 21 down through pipe string 10 filling subterranean fissures in the vicinity of the lower end of well 11, as is well known in the art. In conveying the transmitter 16 positioned between two resilient end sections 17, 17', a considerable amount of pressure, such as 200 to 500 pounds per square inch, may be required to push the resilient sections 17, 17' and thus the transmitter, as is the case with a conventional wiper plug approach. Once the transmitter reaches the predetermined location, that is, at the joint where switch actuator 45 is situated, it is locked into that position.

To contain explosive material conventional blocking means and steps may be employed. For example, an expandable packer 20 may be mounted on the outside surface of the pipe string 10 section adjacent the coupler 26 or any other suitable position. After final placement of pipe string 10, the packer 20 is expanded and fills the space between the casing 12 and pipe string 10 and thereby creates a plug to prevent egress of the explosive material.

If a well fluid is to be used for tamping material 18, and the same fluid is also used to force transmitter 16 down the hole, then transmitter 16 delay time might be selected preferably for zero delay. But if cement is to be used for tamping material 18, transmitter 16 delay time might be set for a period of time long enough to provide ample time to cure the concrete hard enough to provide the required plugging action of tamping material 18.

The inactive transmitter 16 is introduced into pipe string 10 and pumped down the hole preferably using force developed by pump 8 at well head 6. As transmitter 16 proceds down the hole through pipe string 10 (referring to FIG. 2), it moves into the narrower diameter of switch actuator 45. Bevelled surface 34 of switch actuator 45 engages and depresses switch arms 36, 36' of transmitter 16 simultaneously, causing the time delay function of transmitter 16 to be initiated. Under force from pump 8 at well head 6, transmitter 16 continues its travel down through the hole until bevelled surface 34's portion of switch actuator 45 engages and desirably compresses snap ring 38 and, finally, bevelled portion 34 of switch actuator 45 engages bevelled portion 40 of transmitter 16 and the downward motion of transmitter 16 preferably is stopped. Snap-ring 38 is compressed as it passes and clears the narrower diameter of switch actuator 45. The snap-ring expands into a recess 27 in a portion of switch actuator 45 thereby desirably locking the transmitter into a predetermined fixed position in pipe string 10. Of course, if transmitter 16's delay time is set to zero prior to insertion of transmitter 16, into pipe string 10, at well head 6, transmitter 16 will begin to transmit upon initial closure of switch actuating arm 36, 36' to switch contacts 37 and 37'. If transmitter 16's delay time is set for a longer period, clock delay 101 (FIG. 4) begins to run and time is thus allowed to install and cure tamping material 18 in pipe string 10 above transmitter 16.

Transmitter 16 is designed preferably to emit a 4–7 KHz periodic pulsed signal that may have an envelope. (Waveform A of FIG. 5) According to an illustrative example, the pulse width is set approximately 5 milliseconds and pulses are spaced preferably approximately 200 milliseconds or in a range of from approximately 150 milliseconds to approximately 215 milliseconds. Transmitter 16 has transducer 19 preferably made of piezoelectric elements and in contact with case member exterior bevel 40 on transmitter 16, as illustrated in FIG. 2. The transducer converts electrical signals generated by transmitter 16 to acoustic signals and applies them to the string 10 via bevelled contacts 40, 34. Acoustic signals propagate through bevel 40 of transmitter 16 and bevel 34 of switch actuator 45 and hence down pipe string 10 to lower end short pipe section 61.

Referring to FIG. 3, these periodic acoustic signals propagate from short pipe section 61 to transducer 65 of receiver 14. Transducer 65 converts the acoustic signals back to the electrical form and feeds them to amplifier 112 of receiver 14. Amplifier 112 amplifies the signals and feeds them to decoder 114.

The illustrative circuitry 114 shown in detailed logic diagram form in FIG. 6 receives and decodes the signals from the amplifier 112. The signals from amplifier 112 are used to trigger Schmidt Trigger circuit 123. This circuit provides threshold detection and wave shaping for the input signals. The output of Schmidt Trigger 123 is fed to C input terminal 127 of 75 milliseconds one-shot multivibrator 120. An output 130 of one-shot multivibrator 120 goes high for a period of 75 milliseconds in response to a positive going waveform being presented at C input terminal 127. $\overline{Q}$ output terminal 141 goes low during this time. Counter 133 is an eight bit shift register; i.e., it yields a high output at terminal 174 in response to eight successive positive going input pulses at C input terminal 132 causing firing of detonator 81. However, one-shot 120 is unable to output a second positive going output for a period of 75 milliseconds after it has been triggered (see B, FIG. 5). This effectively prevents reverberations of the transmitted acoustic pulse in pipe string 10 from being incorrectly recognized as successive transmitter 16's pulses. At the end of 75 milliseconds, one-shot multivibrator 120 reverts to its initial state and output $\overline{Q}$ at terminal 141 goes high. One-shot multivibrator 149, having its C input 147 connected to $\overline{Q}$ output terminal 141 of one-shot multivibrator 120, changes state. $\overline{Q}$ terminal 151 goes high and stays high for 75 milliseconds (see waveform C, FIG. 5). If during the time that one-shot multivibrator 149 is on ($\overline{Q}$ is low at terminal 151) one-shot multivibrator 120 is again triggered by an output from Schmidt Trigger 120 is again triggered by an output from Schmidt Trigger 123, both input terminals 143 and 153 to NOR gate 145 would be low and this would generate a high output at terminal 154 and input t terminal 155 of NOR gate 157. This causes a low output 163 from NOR gate 157 regardless of the state of input terminal 161. Inverter 167, having its input terminal 165 connected to this output, produces a high level on output terminal 169 and hence on R terminal 171 of counter 133. This signal resets counter 133 to zero. This means that since the signal from Schmidt Trigger 123 that caused this reset occurred not less than 75 milliseconds after transmitter 16's pulse, (FIG. 6 waveform A) and not more than 150 milliseconds after transmitter 16's pulse due to the time range of Q output of one-shot multivibrator 149 (see waveform C, FIG. 6), the signal which caused the reset must be an undesirable signal caused by the environment. So it can be seen that for a 75 millisecond period starting 75 milliseconds after reception of the first pulse, the receiver will reject noise pulses by resetting counter 133 to zero. This protects the system from extraneous environmental noise which could otherwise create false signals to trigger detonator 81.

The 1.75 second one-shot multivibrator 139, having its C input 137 connected to Q output 130 of one-shot multivibrator 120, will trigger on the first input signal from Schmidt Trigger 123. Q output terminal 159 of one-shot multivibrator 139 will have waveform D of FIG. 6, being at a high level for 1.75 seconds after trigger time. $\overline{Q}$ output terminal 159 of one-shot 139 will be low for a corresponding period of time since it is the complement of Q. Input terminal 161 of NOR gate 157 will be low during this time being connected to $\overline{Q}$ output terminal 159 of 1.75 seconds one-shot 139. This results in a high output at terminal 163 of NOR gate 157 and a low output at terminal 169 of inverter 167. If by the end of the 1.75 seconds period eight transmitter signals have not been fed to input terminal 132 of counter 133, the signal from $\overline{Q}$ of one-shot multivibrator 139 will go high and acting through NOR gate 157 and inverter 167, R input 171 of counter 133 will go high and reset the counter to zero. Since eight transmitter pulses would nominally occupy 7 × 200 milliseconds on 1.4 seconds in time, this means that this 1.75 second (delayed) reset would occur only as a result of a random series of noise generated input pulses. So it can be seen that the system of the invention protects against single noise input pulses and against aperiodic noise input pulses by resetting counter 133 to zero. This provides the necessary high safety required of the system of the invention.

If however, eight successive periodic transmitter pulses are received by receiver 14 and counted therein by eight bit shift register 133, Q output terminal 174 of register 133 will go high supplying the necessary electrical signals to fire detonator 81 contained within receiver 14 at the bottom of the well. Initiation of detonator 81 will then cause explosion of lead charge 85, which in turn causes explosion of booster 95. Explosion of booster 95 in turn causes the explosives pumped into the fractures in the well area surrounding the receiver to explode.

In the foregoing, an illustrative embodiment of the invention has been described. It will be readily apparent to one skilled in the art that other embodiments of the invention may be accomplished.

Thus, for example, the encoding and decoding circuitry may be modified or redesigned from the one shown and described above in conjunction with FIGS. 4, 5 and 6 to take into account existing environmental conditions. In this connection it has been found that both the mechanical resonant frequency of the transducer in the transmitter and the natural frequency of the electronic driving oscillator tend to drift when subjected to variations in ambient pressures and temperatures. In order to assure that the transducer is excited at its mechanical resonant frequency the electronic driving oscillator is swept in frequency using standard frequency chirping techniques.

At the receiving end, the decoder circuitry should then be designed using conventional circuit means for receiving and decoding the chirped signal.

The encoder and decoder may also be designed to generate and receive aperiodic pulses to render the system immune to a periodic noise source such as that generated by the well pump and propagating down the pipe.

Various changes and modifications to the present invention may be made without departing from the spirit and scope of the present invention. Accordingly, it is not intended that the invention is restricted to the illustrative embodiments described herein above. The scope of the invention is encompassed and set forth in the accompanying claims.

What is claimed is:

1. A trigger system for actuating a detonator situated at a remote position, comprising:
    conduit means being capable of providing acoustic wave propagation;
    transmitting means for sending a predetermined coded acoustic wave signal through said conduit means; said transmitter means further comprising:
        encoding means for modulating said transmitter means with a predetermined aperiodic coded electrical signal;
        transducer means for converting said predetermined aperiodic coded electrical signal into said aperiodic coded acoustic wave signal for propagation through said conduit means;
    receiving means including means for converting said aperiodic coded acoustic wave signal into an output electrical signal; and
    output means responsive to the output electrical signal for triggering the detonator.

2. The system according to claim 1 including means for chirping said modulated electrical signal before it is converted into the aperiodic coded acoustic signal at the resonant frequency of said transmitting means.

3. The system according to claim 2, said chirping means sweeping a range of frequencies in which the resonant frequency of said transmitting means varies under a varying ambient pressure and temperature.

4. A trigger system for actuating a detonator situated at a remote position, comprising:
    conduit means being capable of providing acoustic wave propagation, said conduit means further comprising:
        hollow pipe means disposable in a casing in a bore hole reaching a subterranean area from a surface;
    transmitting means for sending a coded acoustic wave signal through said conduit means;
    receiving means including means for converting said coded acoustic wave signal into an output electrical signal, said receiving means acoustically coupled to near the bottom of said pipe means;
    actuating means disposed on said pipe means remote from said receiving means;
    means for lowering said transmitting means into said pipe means past said actuating means;
    said transmitting means having a power supply and at least one switch, said switch being actuatable by said actuating means for activating said transmitting means to generate said coded acoustic wave signal and acoustic coupling means for enabling said transmitting means to send the acoustic coded wave signal to said receiving means through said pipe mean; and
    output means responsive to the output electrical signal for triggering the detonator.

5. The system according to claim 4 wherein said pipe means includes at least two hollow pipe sections of a uniform internal cross section wherein said switch actuating means and acoustic coupling means is disposed at the joint between the two sections.

6. The system according to claim 5 wherein the switch actuating means includes a bevelled surface protruding from the interior surface of said joint between the two sections, said at least one switch of said transmitting means including at least one moveable switch arm positionable in contact with the interior surface of the pipe sections and being in open position, said at least one moveable arm being spring mounted so that as it passes by said bevelled surface, it is urged to close the contact and actuate said transmitting means.

7. The system according to claim 6 including a housing for said transmitting means, said housing having a protruding ring member in slidable contact with the interior of said pipe means and means for retaining said transmitting means securely in position at the pipe section joint.

8. The system according to claim 7 including means for activating the system.

9. The system according to claim 4 wherein said transmitting means includes an adjustable timer having means for setting said timer for delaying the detonation a predetermined time after the transmitting means is activated.

* * * * *